(12) United States Patent
Thacker (10) Patent No.: US 7,265,303 B2
(45) Date of Patent: Sep. 4, 2007

(54) ELECTROMAGNETIC DIGITIZER SENSOR ARRAY

(75) Inventor: Charles P. Thacker, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 10/736,841

(22) Filed: Dec. 17, 2003

(65) Prior Publication Data

US 2005/0133279 A1 Jun. 23, 2005

(51) Int. Cl.
*G06K 11/06* (2006.01)
*G09G 5/00* (2006.01)

(52) U.S. Cl. .................... 178/18.07; 345/173
(58) Field of Classification Search ............. 178/18.03, 178/18.07, 19.01, 19.03, 20.01; 345/173–178
See application file for complete search history.

(56) References Cited

U.S. PATENT DOCUMENTS

| 3,818,133 | A | * | 6/1974 | Cotter ..................... 178/19.03 |
|---|---|---|---|---|
| 4,423,286 | A | | 12/1983 | Bergeron |
| 4,571,454 | A | * | 2/1986 | Tamaru et al. ........... 178/18.06 |
| 4,694,124 | A | * | 9/1987 | Blesser .................... 178/18.07 |
| 4,740,660 | A | * | 4/1988 | Kimura ................... 178/18.02 |
| 4,878,553 | A | * | 11/1989 | Yamanami et al. ...... 178/18.07 |
| 5,117,071 | A | * | 5/1992 | Greanias et al. ........... 345/178 |
| 5,136,125 | A | | 8/1992 | Russell |
| 5,218,173 | A | | 6/1993 | Garwin et al. |
| 5,239,489 | A | | 8/1993 | Russell |
| 5,276,282 | A | * | 1/1994 | Russell .................... 178/18.07 |
| 5,554,828 | A | * | 9/1996 | Primm .................... 178/19.06 |
| 7,176,907 | B2 | * | 2/2007 | Chao et al. ................. 345/179 |
| 2004/0130534 | A1 | * | 7/2004 | Chao et al. ................. 345/173 |
| 2004/0174343 | A1 | * | 9/2004 | Chao et al. ................. 345/173 |

* cited by examiner

*Primary Examiner*—Amr A. Awad
*Assistant Examiner*—Stephen G Sherman
(74) *Attorney, Agent, or Firm*—Birch, Stewart, Kolasch & Birch, LLP (57) ABSTRACT

An electromagnetic digitizer arrangement that may include a comb-like pattern of sensing traces that form various sensing loops depending upon the configurations of various switches is described. The comb arrangement of traces may be fabricated using only a single layer per sensing axis. Thus, the digitizer may be fabricated in a technology, such as indium tin oxide on glass, that cannot provide plated-through holes.

15 Claims, 11 Drawing Sheets

ELECTROMAGNETIC DIGITIZER SENSOR ARRAY

FIELD OF THE INVENTION

Aspects of the present invention are directed generally to an improved electromagnetic digitizer, and more specifically to an improved arrangement of sensing traces in an electromagnetic digitizer.

BACKGROUND

Figure 1:
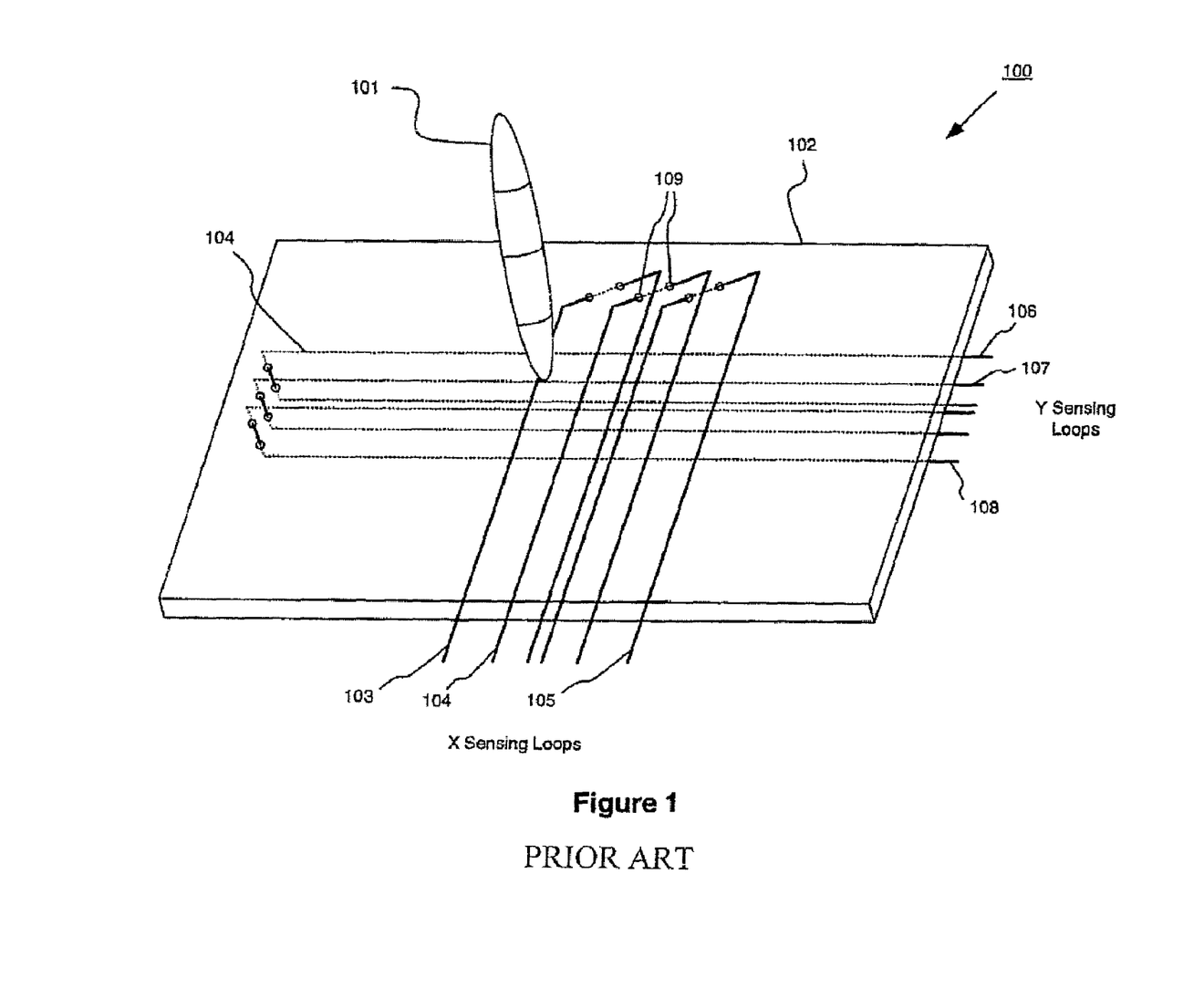
FIG. 1 is a perspective view of a conventional electromagnetic digitizer.

A conventional electromagnetic digitizer 100 as shown in FIG. 1 includes a printed circuit board 102 upon which are printed a number of conductive planar sensing loops, such as sensing loops 103 through 108. Sensing loops 103-105 are printed on one side of the printed circuit board 102 and sensing loops 106-108 are printed on the other side of the printed circuit board 102. Each sensing loop produces an electrical signal with an amplitude and phase that are determined by the position of a stylus 101 with respect to the printed circuit board 102. The sensing loops 103-105 are arranged into two sets, one for detecting the X position of the stylus 101, and the other for detecting the Y position of the stylus 101. Typically, the electromagnetic digitizer 100 has thirty-two X sensing loops and twenty-four Y sensing loops, although these numbers may vary. The stylus 101 typically generates a magnetic field that influences currents in the sensing loops 103-108. An analysis of the electrical signals in the sensing loops 103-108 provides sufficient information to determine the location of the stylus 101 relative to the printed circuit board 102.

These types of digitizers require plated through-holes in the printed circuit board 102. Examples of such through-holes are shown as through-holes 109. The through-holes 109 provide conductive paths through the printed circuit board 102 from one surface to the other opposing surface. Because the sensing loops corresponding to a particular sensing axis (the X sensing loops 103-105 or the Y sensing loops 106-108) are interleaved and overlapping, the through-holes 109 allow the sensing loops 103-108 to cross each other without short circuiting. Because of the need to prevent short-circuiting, nobody has made such electromagnetic digitizers using a single layer. Instead, diagonal paths (the paths that pass through the through-holes 109) that form the top side of each of the sensing loops are placed on the opposite surface of the printed circuit board 102. The end paths are diagonally shaped to reduce the number of through-holes necessary and the complexity of the interleaved sensing loop shape.

A problem with requiring plated through-holes is that they require additional manufacturing, which consumes time and money. Another problem is that the through-hole requirement limits the types of materials that may be used to fabricate the electromagnetic digitizer 100; those materials that cannot support plated through-holes, such as glass, cannot be used to fabricate the electromagnetic digitizer 100.

In addition, the diagonal configuration of the ends of the sensing loops consumes excessive space on the printed circuit board 102 that is not itself usable for sensing the position of the stylus 101. Thus, the extended points of the diagonal paths may be considered overhead, and to provide space for the diagonal traces and to minimize nonlinearity, the printed circuit board 102 must extend beyond the active area of the digitizer. Thus, when such a digitizer is integrated with a liquid crystal display to create a stylus-sensitive display, for example, the digitizer must be larger than the displayable area. This overhead space is undesirable to the user because it makes the product larger than apparently necessary, and it creates considerable manufacturing difficulties as well.

Figure 2:
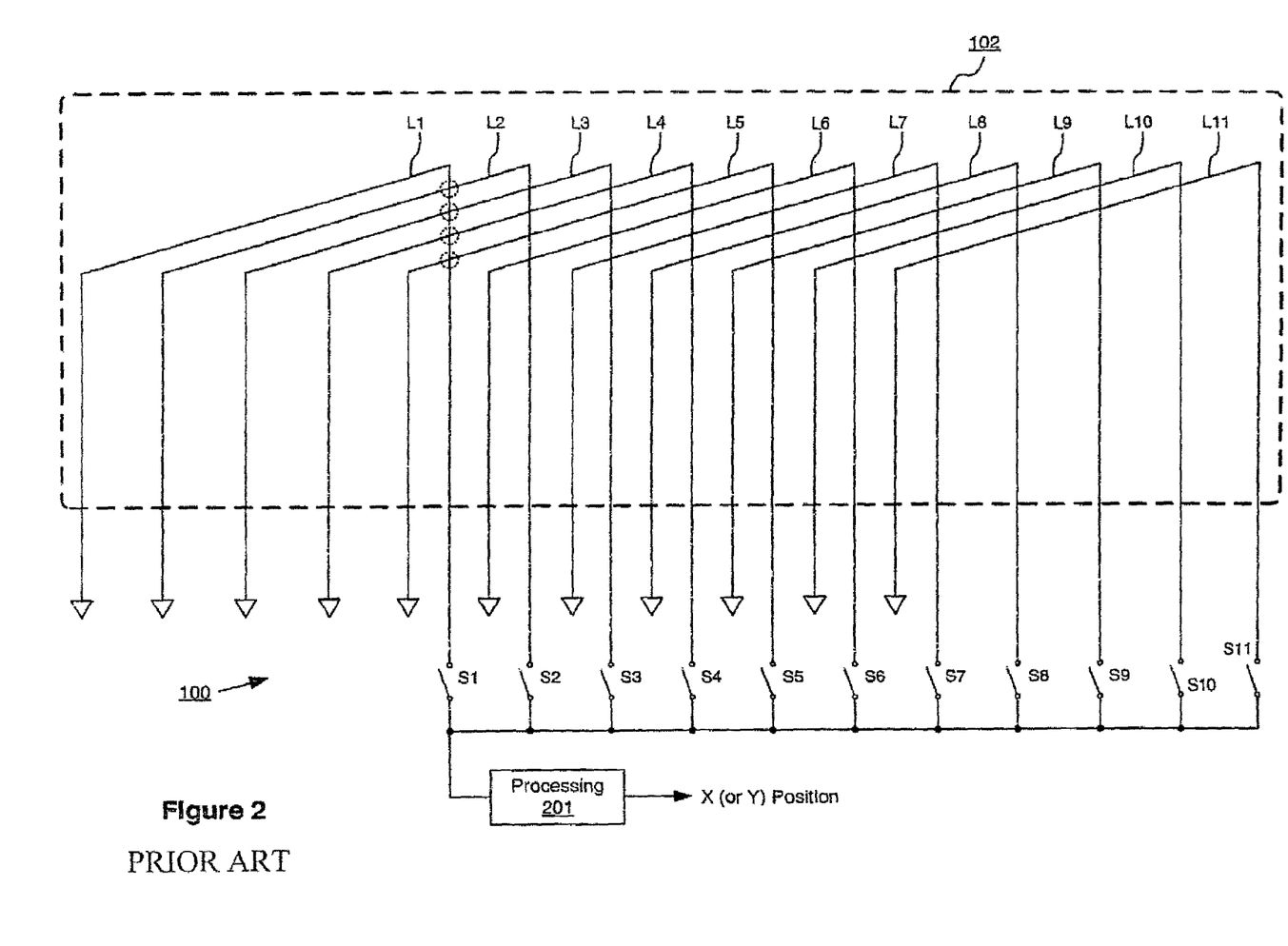
FIG. 2 is an electrical schematic of a conventional electromagnetic digitizer.

FIG. 2 provides an electrical schematic of a portion of the electromagnetic digitizer 100, shown in this case with eleven sensing loops L1 through L11. Only one sensing axis is shown in FIG. 2. The sensing loops L1-L11 are selectively coupled to a processing unit 201 that determines the position of the stylus 101 relative to the sensing loops L1 through L11. The details of the signal processing by the processing unit 201 vary among manufacturers. Wacom Technology Corporation provides digitizers that excite a resonant circuit in the stylus and then terminate the exciting signal. The amplitude of the exponentially decaying oscillatory field is measured. Fine Point Innovations uses a stylus with a battery that runs an oscillator to produce a steady signal. In any event, the amplitude and the phase of the signal from each sensing loop L1-L11 is measured by sequentially connecting the sensing loops to the processing unit 201 that uses analog multiplexors. FIG. 2 represents the multiplexors as switches S1 through S11. Depending upon which switch is closed, a different one of the sensing loops L1-L11 is activated to form a circuit between the processing unit 201 and ground. Only one of the switches S1 through S11 is closed at a time.

As previously discussed, a problem with the design of FIGS. 1 and 2 is that the sensing loops must cross one another, which translates into through-hole manufacturing problems. Such crossings where through-holes are necessary are indicated by way of examples as broken circles showing where sensing loop L1 overlaps with sensing loops L2 through L5 at their diagonal paths. The points where the various sensing loops overlap cannot electrically touch one another or else undesired short circuits will develop.

An improved electromagnetic digitizer design is needed to overcome at least one or more of the above-identified problems.

SUMMARY

Aspects of the present invention are therefore directed to an improved sensor board that includes a "comb" pattern of sensing traces that form various sensing loops. This comb arrangement of traces may be fabricated using only a single layer per sensing axis. Thus, a digitizer may be fabricated in a technology, such as indium tin oxide on glass, that cannot provide plated-through holes.

Further aspects of the present invention provide a highly compact layout of sensing traces, thus allowing the sensor board to be smaller. Where the sensor board is integrated with a display such as a liquid crystal display, the amount by which the sensor board exceeds the size of the active digitizer area may be reduced as compared with conventional integrated displays/digitizers.

Still further aspects of the present invention provide a set of sensing traces that are switchable so as to dynamically allow sensing loops to be defined in various sizes and directions in a flexible manner. For example, a given pair of sensing traces may be configured to define either a clockwise or counter-clockwise sensing loop as desired.

These and other features of the invention will be apparent upon consideration of the following detailed description of the embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 3:
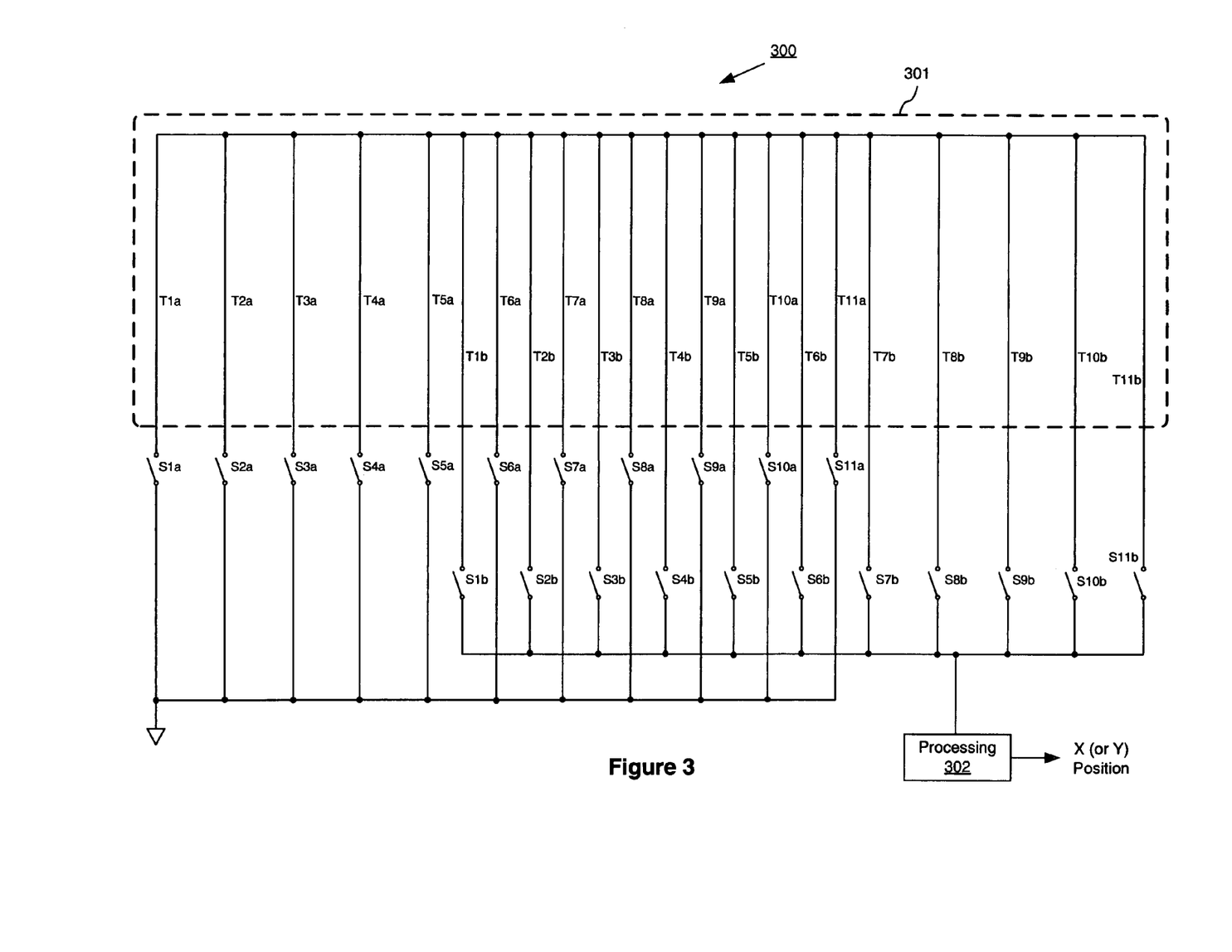
FIG. 3 is the electrical schematic of FIG. 3 showing an illustrative path through the electromagnetic digitizer, in accordance with at least one aspect of the present invention.
Figure 4:
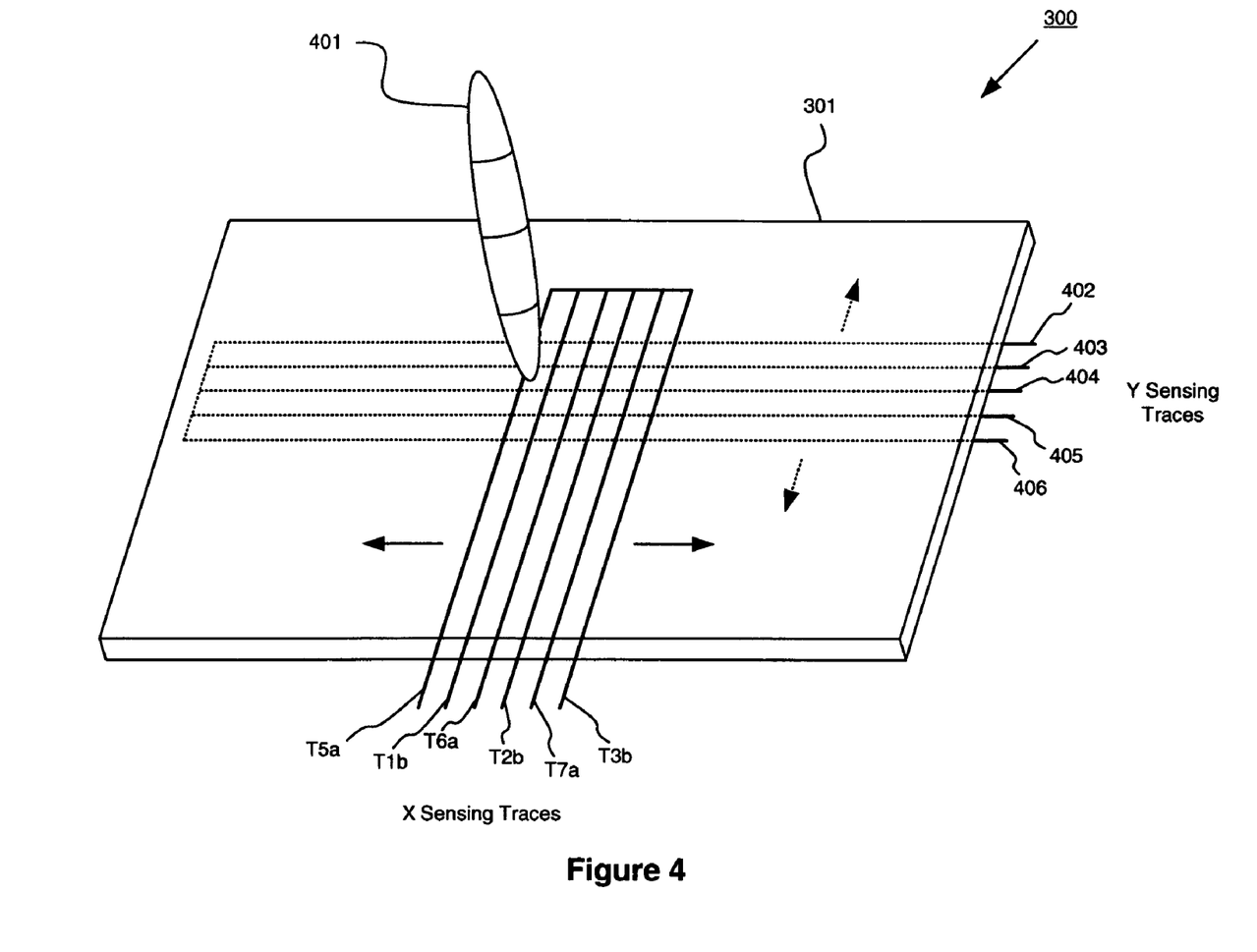
FIG. 4 is a perspective view of the illustrative electromagnetic digitizer of FIG. 3.

Referring to FIGS. 3 and 4, an illustrative electromagnetic digitizer 300 is shown including a plurality of sensing traces T1a through T11a and T1b through T11b arranged in a comb-like pattern. Sensing traces T1a through T11a will be referred to collectively as the "a" sensing traces, and sensing traces T1b through T11b will be referred to collectively as the "b" sensing traces. The "a" and "b" sensing traces as shown may all be used for a single sensing axis, such as for sensing the X position or Y position of a stylus 401. An additional set of sensing traces may be used for another sensing axis. The "a" and "b" sensing traces may be disposed on and/or in a substrate 301. The "a" and "b" sensing traces may be formed of any conductive or semi-conductive material, such as but not limited to metal. The substrate 301 may be of any non-conductive or semi-conductive material, such as, but not limited to, plastic, glass, fiberglass, printed circuit board, or fabric.

Each of the "a" and "b" sensing traces may be electrically coupled to each other at one end (as shown near the top of FIG. 3), which may be an electrically floating node. At the other end, each of the "a" and "b" sensing traces may each be coupled to one or more switches. As shown, the "a" sensing traces are each coupled via a switch to ground (or to another fixed or variable potential node). These switches S1a through S11a are referred to collectively as the "a" switches. The "b" sensing traces are each coupled via a switch to a processing unit 302. These switches S1b through S11b are referred to collectively as the "b" switches. Depending upon the configurations of the "a" and "b" switches, circuit loops may be formed that act as sensing loops. For example, referring to FIG. 5, if switches S4a and S4b are closed (i.e., conductive), and all of the other "a" and "b" switches are open, then a circuit is formed from the processing unit 302, through sensing trace T4b, through sensing trace T4a, and then to ground. Sensing traces T4a and T4b thus form a sensing "loop" in or on the substrate 301. The term loop as used herein is intended to include a conductive path that at least partially defines the boundary of an area. For example, the previously-described sensing loop defines an area between sensing traces T4a and T4b, and further bounded by the horizontal conductor near the top of FIG. 3 that connects the ends of sensing traces T4a and T4b.

Figure 5:
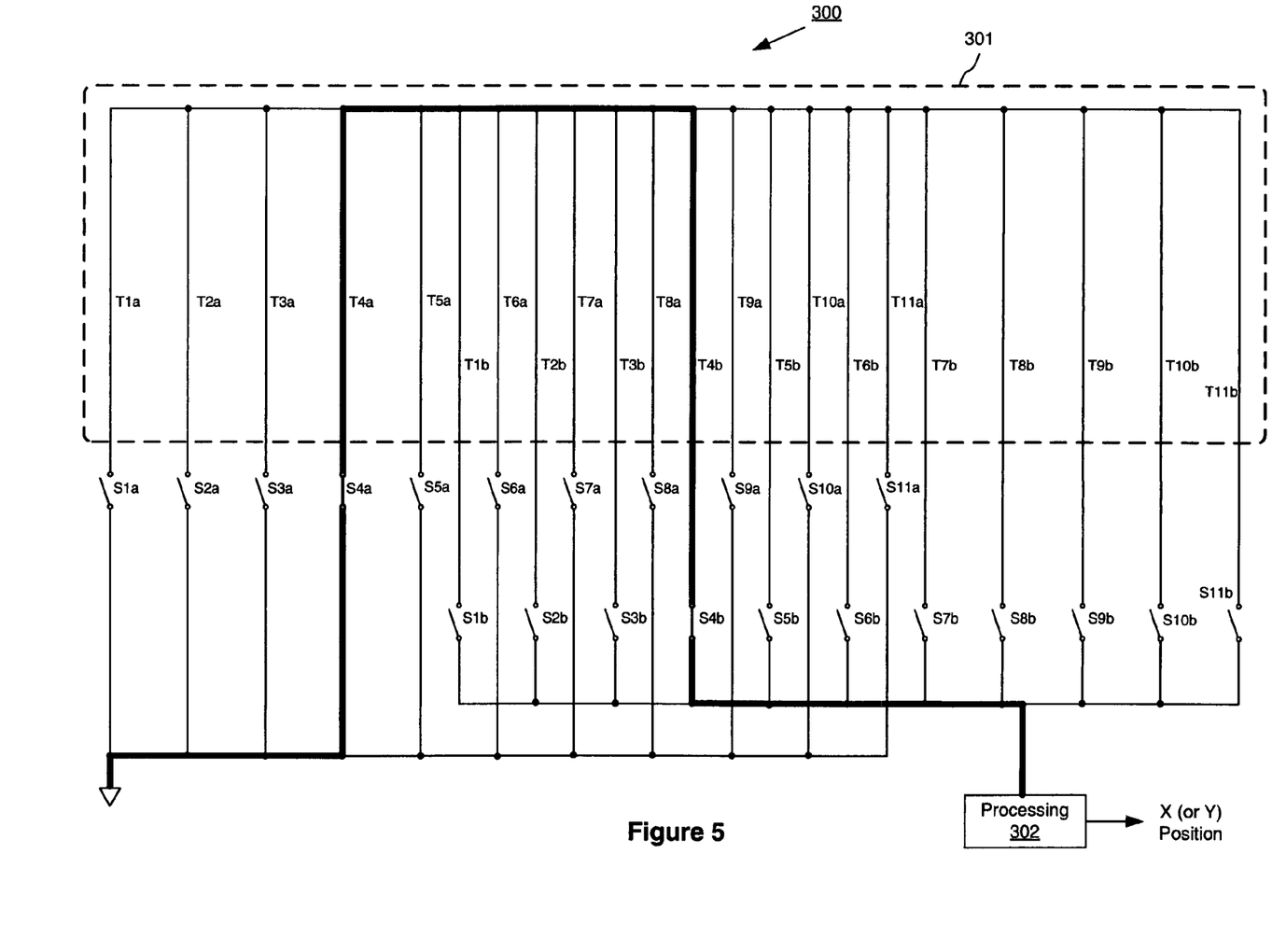
FIG. 5 is another electrical schematic of the illustrative electromagnetic digitizer of FIG. 3, showing an illustrative sensing loop path.

As another example, if switches S5a and S5b were closed (and all of the other "a" and "b" switches are open), then a different sensing loop is selected along sensing traces T5a and T5b. A third example is where switches S4a and S1b are closed, resulting in a smaller sensing loop being selected along sensing traces T4a and T1b. A larger sensing loop may be selected by closing, e.g., switches S3a and S5b, thereby selecting a sensing loop utilizing sensing traces T3a and T5b. Thus, the illustrated embodiment allows not only the locations of selected sensing loops, but also the sizes of selected sensing loops, to be varied. This flexibility may be taken advantage of to improve the linearity and/or performance of stylus tracking algorithms in the processing unit 302. For example, selecting smaller sensing loops may allow the position of the stylus 401 to be more accurately determined, while selecting larger sensing loops may allow the position of the stylus 401 to be only generally defined but with less processing overhead.

In general, pairs of "a" and "b" switches may be selected to determine which sensing loop is to be selected at any given moment. At any given time, it is preferable in the shown embodiment that only a single "a" switch and only a single "b" switch are simultaneously closed. Otherwise, a short circuit may develop that would disable or otherwise alter a selected sensing loop.

The processing unit 302 or another unit such as a switch controller may dynamically control the states of the various "a" and "b" switches in order to select appropriate sensing loops. The processing unit 302 may be any type of processor that can interpret electrical signals from the various sensing traces to determine a position of the stylus 401. To determine the position of the stylus 401, the "a" and "b" switches may be controlled to sequentially select a series of sensing loops in a desired order. For instance, switch pairs S1a and S1b may be closed, then switch pairs S2a and S2b may be closed, then switch pairs S3a and S3b may be closed, and so on. This process may be repeated to periodically re-evaluate the position of the stylus 401. Other sequences of sensing loops may be selected as desired.

The "a" and "b" switches are shown schematically as individual switches. However, the "a" and "b" switches may be implemented in a variety of ways. For example, the "a" and "b" switches may be implemented as one or more multiplexors or crossbars. The term "switch" as used herein is intended to broadly include, but not necessarily be limited to, any apparatus or device that actually or functionally switches between blocking or passing the signal and/or switches the signal between two or more different paths.

In FIG. 4, some of the sensing traces T5a, T1b, T6a, T2b, T7a, and T3b are shown arranged on the substrate 301. As shown, sensing traces T5a, T1b, T6a, T2b, T7a, and T3b are used as X-axis sensing traces, for sensing the X position of the stylus 401. These X-axis sensing traces may be formed at a single level, such as in a single layer or on a single surface, of the substrate 301. FIG. 4 also shows a plurality of Y-axis sensing traces, such as sensing traces 402-406, which sense the Y position of the stylus 401. These Y-axis sensing traces may be arranged in the same way as the X-axis sensing traces, except that they may be formed on a different single layer or single surface of the substrate 301 than the X-axis sensing traces.

As can be seen, no through-holes are necessary to achieve the pattern of sensing traces in FIGS. 3 and 4. This is because the shown arrangement of sensing traces, along with the accompanying switches shown in FIG. 3, does not result in an undesirable overlapping of conductive sensing paths. Therefore, each sensing axis of the electromagnetic digitizer 300 may, if desired, be formed at a single layer or surface of the substrate 301. This can be advantageous in that now the electromagnetic digitizer 300 may be formed using materials that do not support plated through-holes, such as indium tin oxide sensing traces formed on a glass substrate. Also, although the "a" and "b" switches are shown as being located off of the substrate 301, they may alternatively be disposed on or in the substrate 301.

Another potential advantage of the sensing trace arrangement of FIGS. 3 and 4 is that it can be made to use less space on the substrate 301 than conventional electromagnetic digitizers for the same amount of active area. This is because the diagonal paths use in conventional digitizers are no longer necessary to avoid short circuits. This means that a greater proportion of the conductive traces that form the sensing traces and the interconnection between the sensing traces, can be devoted to the active area of the digitizer 300. Thus, the embodiment of FIGS. 3 and 4 may be more easily integrated with a display such as a liquid-crystal display, without requiring excessive overhead area around the edges of the display.

Figure 6:
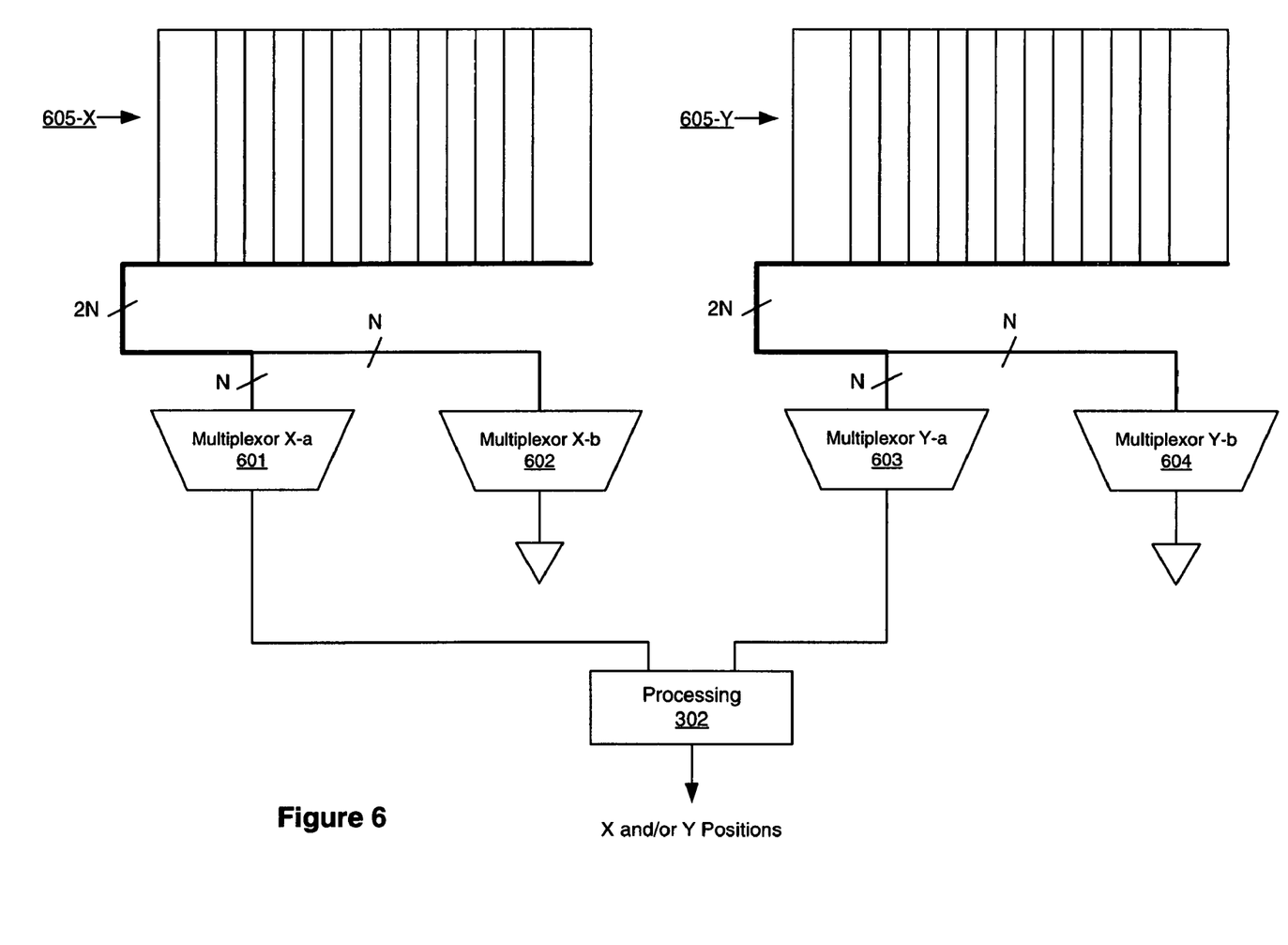
FIG. 6 is another electrical schematic of the illustrative electromagnetic digitizer of FIG. 3, showing both X and Y axis circuits.

Referring to FIG. 6, the X-axis sensing traces are collectively labeled as reference number 605-X, and the Y-axis sensing traces are collectively labeled as reference number 605-Y. A pair of multiplexors 601, 602 are coupled to the X-axis sensing traces 605-X, one implementing the "a" switches for the X axis and the other implementing the "b" switches for the X axis. Thus, in this example, multiplexor 601 implements "a" switches that couple selected X-axis "a" sensing traces to the processing unit 302, and multiplexor 602 implements "b" switches that couple selected X-axis "b" sensing traces to ground.

Another pair of multiplexors 603, 604 are coupled to the sensing traces 605-Y, one implementing the "a" switches for the Y axis and the other implementing the "b" switches for the Y axis. Thus, in this example, multiplexor 603 implements the "a" switches that couple selected Y-axis "a" sensing traces to the processing unit 302 (or to a separate processing unit), and multiplexor 604 implements "b" switches that couple selected Y-axis "b" sensing traces to ground. Although two multiplexors are shown for each axis, any combination of multiplexors may be used. For example, multiplexors 601 and 602 may be combined as a single multiplexor, or one or both may be divided into additional multiplexors. Moreover, the X and Y axes may share one or more multiplexors. Each set of sensing traces 605-X, 605-Y provides 2N signal paths, where N is the number of "a" (or "b") sensing traces for the respective sensing axis.

Figure 7:
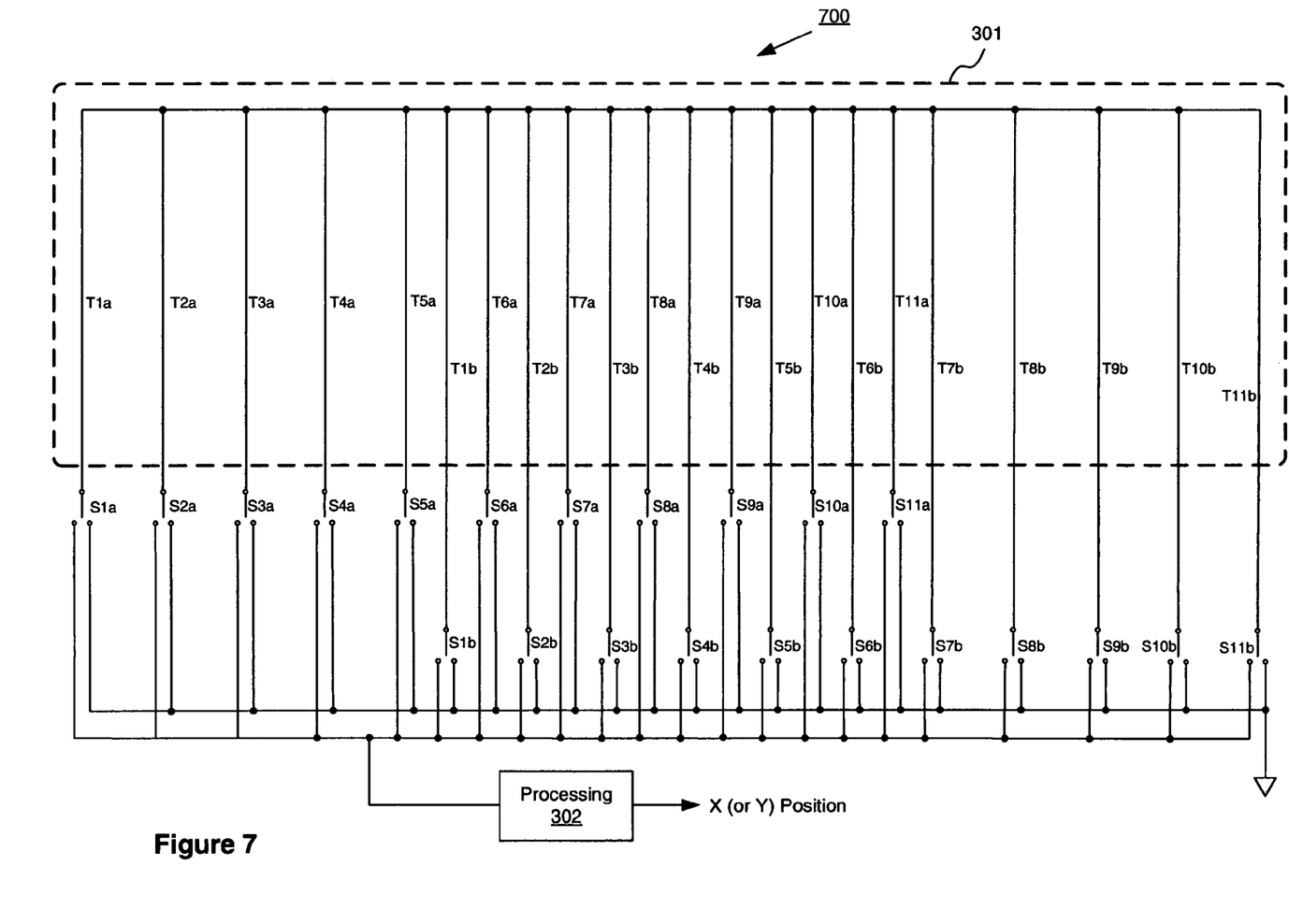
FIG. 7 is an electrical schematic of another embodiment of the illustrative electromagnetic digitizer of FIG. 3.

The "a" and "b" switches are shown in FIG. 3 as being single-pole single-throw (SPST) switches. However, the "a" and "b" switches may be other types of switches, such as single-pole dual-throw (SPDT) switches, single-pole multi-throw switches, multi-pole multi-throw switches, or any other type of switch or combination of switches. For example, a single "a" or "b" switch SPDT as schematically shown may actually be implemented as two parallel SPST switches. Referring to the example of FIG. 7, the "a" and "b" switches are each shown as SPDT switches. In this example, each of the sensing traces 605 both "a" sensing traces and "b" sensing traces, can be switched to either the processing unit 302 or to ground. By equipping each sensing trace in this way with dual switching capability, greater flexibility may be provided in the variety of sensing loops that may be selected. Using such an arrangement, each sensing trace can function as either the left or right leg of a sensing loop where the sensing traces are used to sense along the X sensing axis. Where the sensing traces are used to sense along the Y sensing axis, each sensing trace can function as either the upper or lower leg of a sensing loop.

Figure 8:
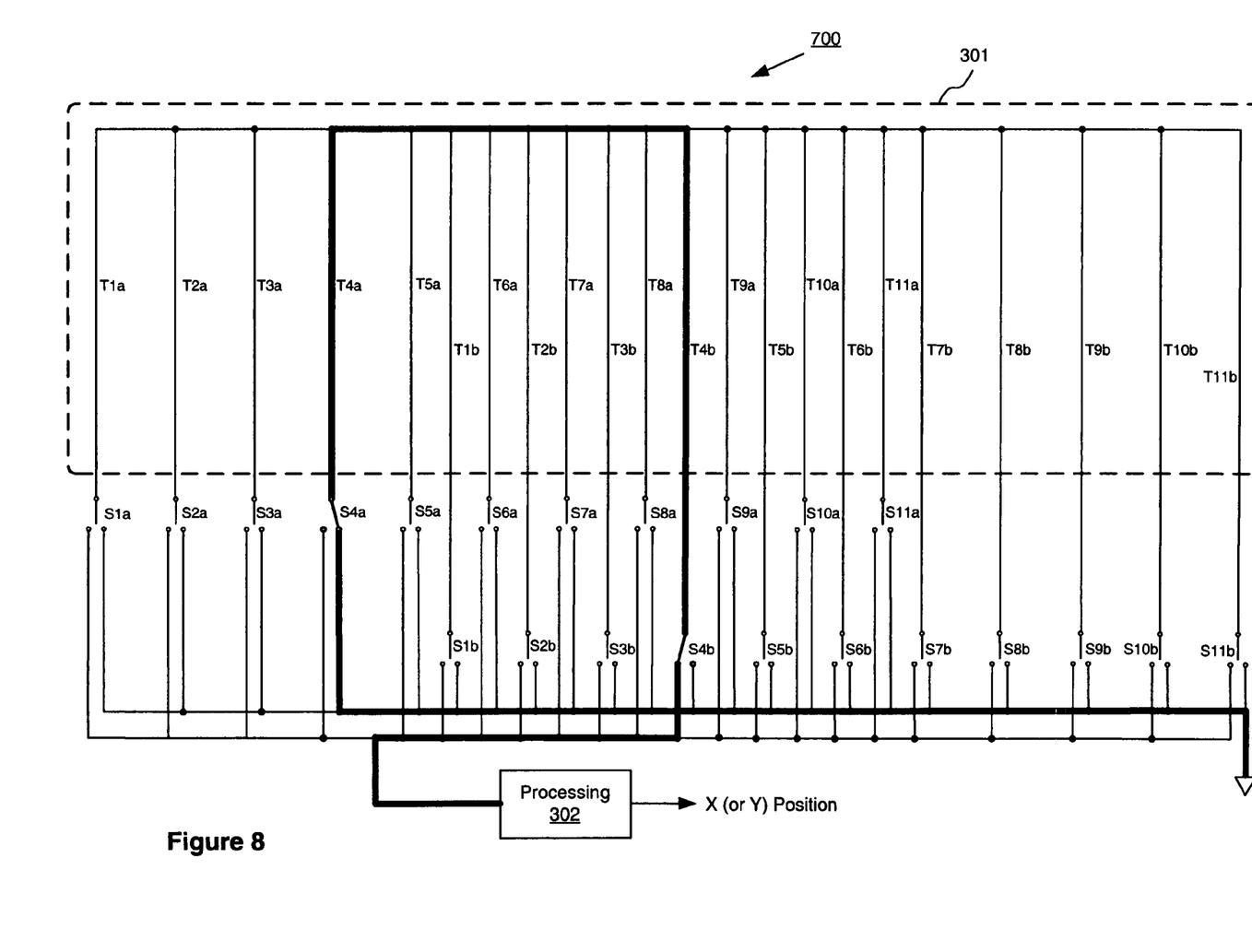
FIGS. 8 through 10 are the electrical schematic of FIG. 7 showing illustrative sensing loop paths through the electromagnetic digitizer.
Figure 9:
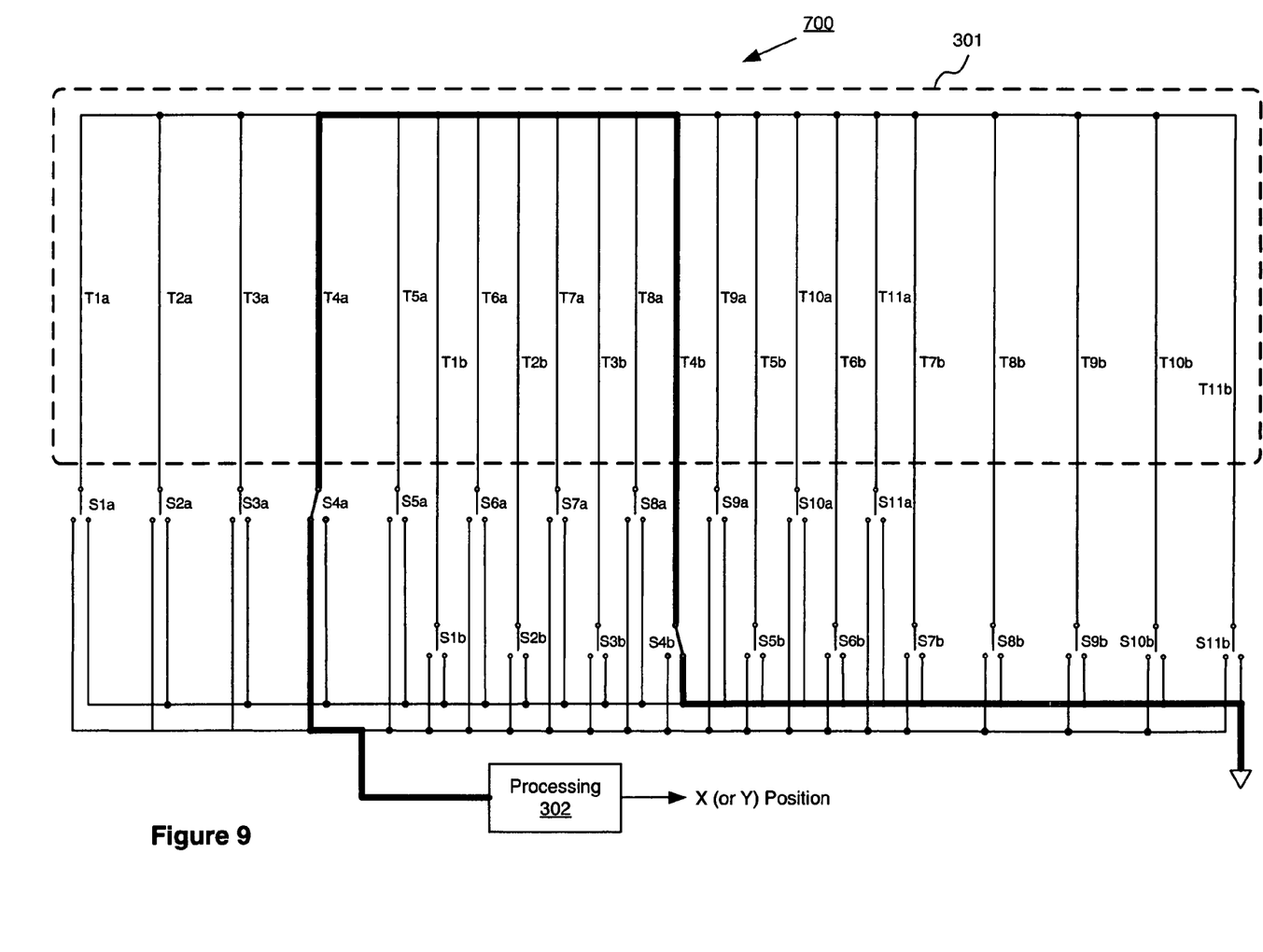
Figure 10:
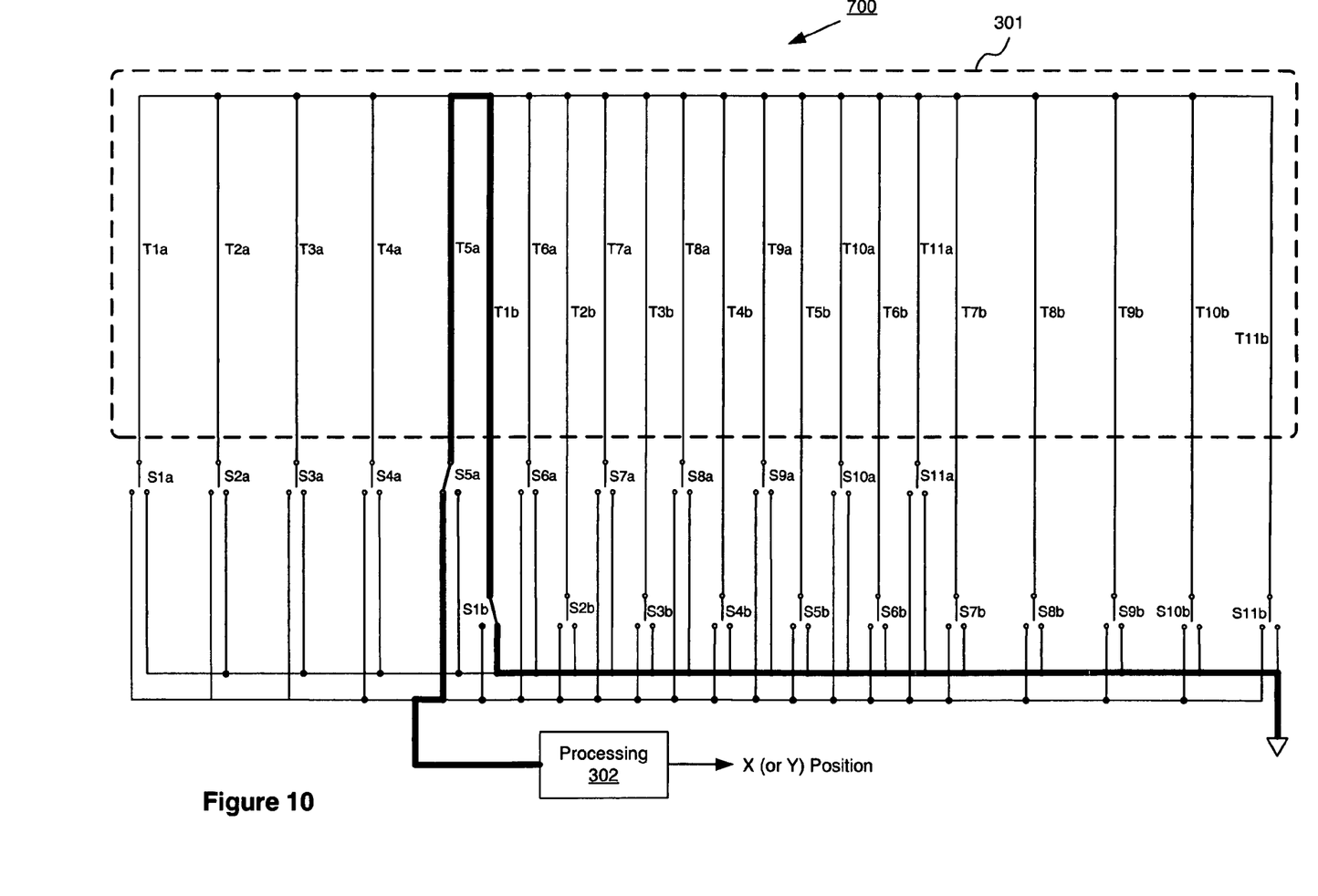

For example, referring to FIG. 8, where switch S4a connects sensing trace T4a to ground and switch S4b connects sensing trace T4b to the processing unit 302, then a sensing loop path is defined from the processing unit 302, through sensing trace T4b, then through sensing trace T4a, and then to ground. Arbitrarily considering the signal in a sensing loop to flow from the processing unit 302 to ground, the previously-described sensing loop would be considered herein to be a counter-clockwise sensing loop. FIG. 9 shows the same sensing loop as FIG. 8, except that the sensing loop is now configured as a clockwise sensing loop. Here, switches S4a and S4b are reversed such that switch S4a connects sensing trace T4a to the processing unit 302 and switch S4b connects sensing trace T4b to ground. Thus, a sensing loop path is defined from the processing unit 302, through sensing trace T4a, then through sensing trace T4b, and then to ground. Another example of a sensing loop that may be selected is shown in FIG. 10, where switch S5a connects sensing trace T5a to the processing unit 303 and switch S1b connects sensing trace T1b to ground. A smaller clockwise sensing loop is thereby selected. Of course, the same smaller sensing loop may be selected as a counter-clockwise sensing loop simply by reversing the settings of switches S5a and S1b. Alternatively, a larger sensing loop may be selected by closing, for example, switches S2a and S6b, thereby selecting a sensing loop using sensing traces T2a and T6b.

Figure 11:
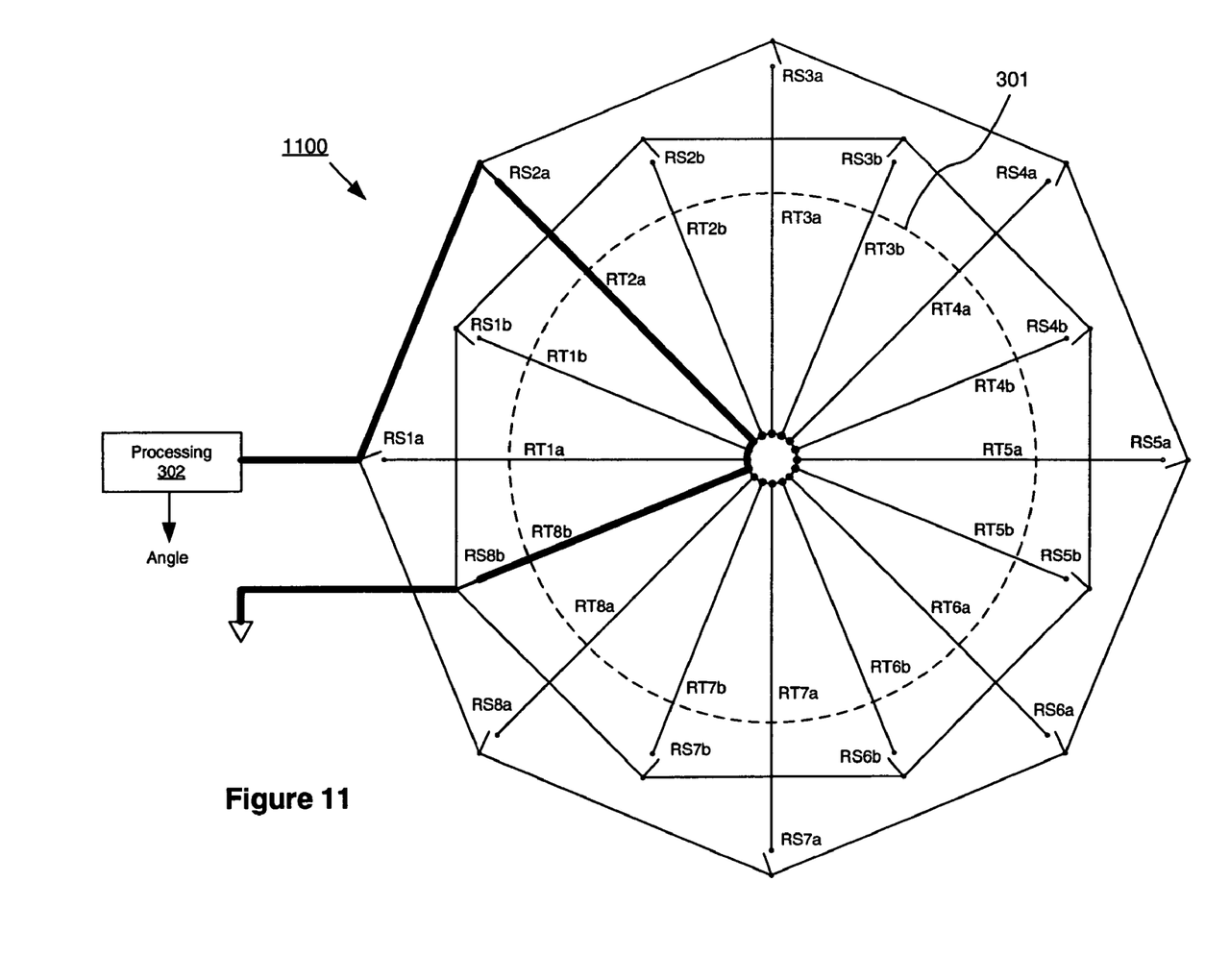
FIG. 11 is an electrical schematic of another embodiment of the illustrative electromagnetic digitizer of FIG. 3, showing a radial layout of sensing traces.

Although the sensing traces have been shown thus far as linear, substantially parallel traces, sensing traces may be fabricated in other shapes and arrangements as well. For instance, sensing traces may be linear or curved and may be arranged at various angles with respect to one another. An illustrative electromagnetic digitizer 1100, as shown in FIG. 11, has a first set of sensing traces RT1a through RT8a arranged as radial spokes pointing away from a common center point. Each of the radial sensing traces RT1a-RT8a is coupled to the processing unit 302 via a different one of a set of switches RS1a through RS8a. A second set of sensing traces RT1b through RT8b are shown also arranged as radial spokes, interleaved with the first set of radial sensing traces. Each of the second set of sensing traces RT1b-RT8b is coupled to ground (or another fixed or variable potential node) via a different one of a set of switches RS1b through RS8b. Such a radial arrangement may be useful for determining an angular position of the stylus 401 within a circle defined by the radial sensing traces. Thus, although X and Y sensing axes have been discussed with regard to previous illustrative embodiments, other sensing axes may be used, such as angular position and radial distance.

While illustrative systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations. In addition, it should be recognized that although various names of objects, enumerations, method, and properties are provided herein, such names are merely illustrative and any names may be used without departing from the scope of the invention.

What is claimed is:

1. An electromagnetic digitizer sensor coupled to a processor, comprising:
   a substrate;
   a first array of sensing traces each coupled between the processor and a first potential node, each sensing trace in the first array being selectively connectable to the processor and further being selectively connectable to the first potential node; and
   a second array of sensing traces each coupled between the processor and the first potential node, each sensing trace in the second array being selectively connectable to the processor and further being selectively connectable to the first potential node to form a loop between the first array of sensing traces and the second array of sensing traces,
   wherein the first array of sensing traces are each disposed at a first level of the substrate but not at a different second level of the substrate, and
   wherein the second array of sensing traces are each disposed at the second level of the substrate but not the first level.

2. The electromagnetic digitizer sensor of claim 1, wherein the first potential node is a ground node.

3. The electromagnetic digitizer sensor of claim 1, wherein
   the second array of sensing traces each coupled between the processor and a second potential node, each sensing trace in the second array being switchable to connect and disconnect to the processor and further being switchable to connect and disconnect to the second potential node.

4. The electromagnetic digitizer sensor of claim 3, wherein at least one of the first and second levels of the substrate are a surface of the substrate.

5. An electromagnetic digitizer sensor coupled to a processor, comprising:
   a substrate;
   a first plurality of sensing traces electrically coupled in parallel between the processor and a first node;
   a second plurality of sensing traces electrically coupled in parallel between a second node and the first node;
   a first plurality of switches each coupled between one of the first plurality of sensing traces and the processor;
   a second plurality of switches each coupled between one of the second plurality of sensing traces and the second node,
   a third plurality of sensing traces electrically coupled in parallel between the processor and a third node;
   a fourth plurality of sensing traces electrically coupled in parallel between the processor and a fourth node;
   a third plurality of switches each coupled between one of the third plurality of sensing traces and the processor;
   a fourth plurality of switches each coupled between one of the fourth plurality of sensing traces and the fourth node,
   wherein the first and second pluralities of sensing traces are disposed at a first level of the substrate but not at a second level of the substrate,
   wherein the third and fourth pluralities of sensing traces are disposed at the second level of the substrate but not at the first level of the substrate,
   wherein the first and second pluralities of sensing traces form first conductive loops, and
   wherein the third and fourth pluralities of sensing traces form second conductive loops.

6. The electromagnetic digitizer sensor of claim 5, wherein the second node and the fourth node are each a ground node.

7. The electromagnetic digitizer sensor of claim 5, wherein the first node and the third node are each a floating node.

8. The electromagnetic digitizer sensor of claim 5, wherein the first plurality of sensing traces are disposed so as to he interleaved with the second plurality of sensing traces.

9. The electromagnetic digitizer' sensor of claim 5, wherein the first plurality of switches are embodied as a multiplexor.

10. The electromagnetic digitizer sensor of claim 5, wherein the first plurality of sensing traces are further switchably connectable to the second node, the second plurality of sensing traces are further switchably connectable to the processor, the third plurality of sensing traces are further switchably connectable to the fourth node, and the fourth plurality of sensing traces are further switchably connectable to the processor.

11. The electromagnetic digitizer sensor of claim 5, wherein the first and second plurality of sensing traces are arranged in a comb-like pattern.

12. The electromagnetic digitizer sensor of claim 5, wherein the first and second plurality of sensing traces are each arranged to be physically parallel with each other, and the third and fourth plurality of sensing traces are each arranged to be physically parallel with each other.

13. The electromagnetic digitizer sensor of claim 5, wherein the first and second plurality of switches are each single-pole-single-throw switches.

14. The electromagnetic digitizer of claim 5, wherein the first conductive loops are variable in both size and position depending upon states of the first and second pluralities of switches.

15. The electromagnetic digitizer of claim 14, wherein the second conductive loops are variable in both size and position depending upon states of the third and fourth pluralities of switches.

* * * * *